(No Model.)
K. C. EDMUNDS.
ICE CREAM FREEZER.
No. 527,483.　　　　　　　　Patented Oct. 16, 1894.
Fig. 1.　　　　　　Fig. 2.
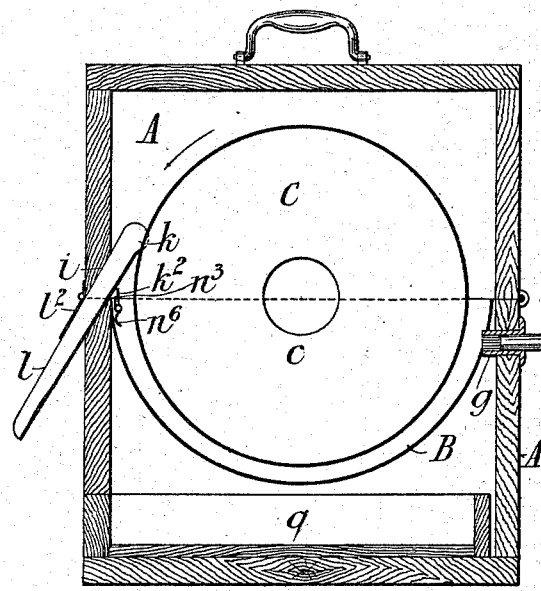
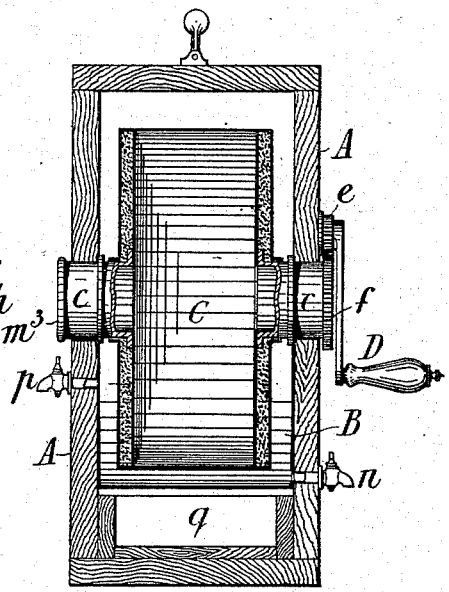
Fig. 3.
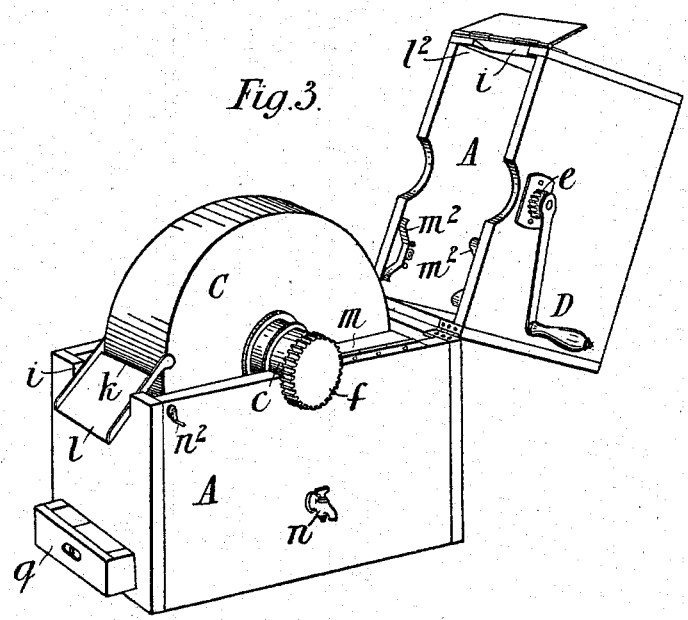
Witnesses.　　　　　　　　Inventor.

UNITED STATES PATENT OFFICE.

KING CHARLES EDMUNDS, OF CALCUTTA, INDIA.

ICE-CREAM FREEZER.

SPECIFICATION forming part of Letters Patent No. 527,483, dated October 16, 1894.

Application filed December 27, 1893. Serial No. 494,852. (No model.)

*To all whom it may concern:*

Be it known that I, KING CHARLES EDMUNDS, a subject of the Queen of Great Britain, residing at Calcutta, India, have invented a new and useful Improved Apparatus for Making Ices or for Analogous Freezing or Cooling Operations, of which the following is a specification.

My invention relates to that class of apparatus in which a hollow drum containing the freezing or cooling agent is arranged to rotate in a receptacle containing the liquid or matter to be frozen or cooled, such liquid when sufficiently cooled being withdrawn, or when frozen adhering to the drum and from which it can be removed, for use; and it consists in certain novel features, as will presently appear.

Figure 1 is a longitudinal section, and Figs. 2 and 3 are respectively a transverse section and a perspective view.

A is a casing, or box, having in its lower portion the semi-circular receptacle B, and carrying bearings in which the axes $c$ of the hollow drum C are mounted so that the said drum can be rotated from outside the apparatus by means of the handle D and gear wheels $e, f$. At one end of the casing or box A is an opening $g$ by which the liquid, or matter, to be frozen or cooled can be introduced, a hopper or chute, or pipe and funnel $h$ being preferably provided for introduction into the said opening to receive the said liquid or matter and conduct it into the receptacle B. The said opening can be closed by a plug or stopper when the funnel is removed. At the other end of the casing A an opening $i$ is provided for the exit of the frozen matter the said exit being furnished with a scraper $k$ and guide or chute $l$, the said scraper $k$ removing the frozen matter from the periphery of the drum C as it is rotated (in the direction of the arrow Fig. 1) against the said scraper so that the frozen matter is received by the said guide or chute $l$ and conducted to any suitable receptacle.

$l^2$ is a flap which closes the opening $i$ when the chute and scraper are removed.

$k^2$ is a projection on the scraper $k$ and $n^2$ is a handle on a shaft carrying a projection $n^3$ with a spring tail $n^6$ so that by moving the handle $n^2$ the projection $n^3$ acts on the projection $k^2$ to move the scraper closer to the drum the spring tail $n^6$ returning the projection $n^3$ to its original position when the handle $n^2$ is released.

$m$ is one of two scrapers hinged to the casing on each side of the drum C so that they by bearing on the sides of the drum remove any matter or liquid tending to freeze thereon.

$m^2$ are springs in the upper part of the box which bear on the scrapers $m$ so as to allow them to yield if any hard frozen matter adheres which would be liable to injure the scrapers.

When liquid is to be cooled only it can be run off by the outlet pipe and tap $n$.

$p$ is an overflow pipe and tap which will indicate when the receptacle B has been sufficiently charged.

The drum C is provided with an opening by which the freezing or cooling mixture or agent is introduced and is provided with double side walls filled with non-conducting material such as asbestos, paper or sawdust so that the mixture to be frozen or cooled with not freeze upon such side walls. The opening to the drum is shown in the drawings as being made through one of the axes and capable of being closed by the plug or stopper $m^3$.

The apparatus may be provided with a handle at top for convenience in carrying it.

$q$ is a drawer for holding the removable fittings.

Having now particularly described and ascertained the nature of my said invention and in what manner the same is to be performed, I declare that what I claim is—

In an apparatus for making ices or for analogous freezing operations and having a hollow drum with double side walls and an opening for introducing the freezing mixture thereinto and means for rotating the drum, and a receptacle for the matter or liquid to be frozen and within which receptacle the periphery of the drum rotates,—the combination therewith of scrapers $m$, hinged to the inside of such receptacle, and the springs $m^2$, in the upper part of the box or casing and bearing on said scrapers as and for the purpose set forth.

KING CHARLES EDMUNDS.

Witnesses:
JOHN E. BOUSFIELD,
*Of the firm of G. F. Redfern & Co., 4 South Street, Finsbury, London, Patent Agents.*
E. CHURCHEN.